Patented Nov. 25, 1952

2,619,468

UNITED STATES PATENT OFFICE 2,619,468

PAINT REMOVER

Fritz Zumbrunnen, Zurich, Switzerland

No Drawing. Application August 3, 1949, Serial No. 108,439. In Switzerland July 7, 1948

2 Claims. (Cl. 252—161)

The means used hitherto for removing surface coatings containing cellulose-nitrate or synthetic resins or chlorinated rubber suffer from the drawback that the surface when the coating is removed has to undergo an after treatment with benzine or other thinners.

It is an object of the present invention to provide a paint remover for surface coatings of the type described, which not only dissolves said coating completely but makes also superfluous said after treatment with benzine or other thinners due to the fact that washing of the treated surface with water is sufficient.

The paint remover according to the present invention preferably has the following composition:

I. A solvent mixture containing the following constituents:

| | Parts by weight |
|---|---|
| Acetone | 800–1000 |
| Methylacetate | 600– 800 |
| Trichlorethylene | 400– 600 |
| 1,2-dichlorethane | 500– 700 |
| Mesityloxide | 800–1000 |

Percentagewise the maximum variations of the constituents are:

| | Percent |
|---|---|
| Acetone | between 20.5 and 30.3 |
| Methylacetate | between 15.4 and 24.2 |
| Trichlorethylene | between 10.2 and 18.2 |
| 1,2-dichlorethane | between 12.8 and 21.2 |
| Mesityloxide | between 20.5 and 30.3 |

II. 4–5% of cellulose nitrate based on the weight of the solvent mixture I.

III. 5–6% of paraffin based on the weight of the combined mixtures I and II, and IV. 5–15% of starch in 15–25% of water based on the total weight of the combined mixtures I, II and III and containing a sufficient amount of a 50% NaOH solution to make the starch-water mixture viscous.

It has been found in practice that this paint remover hydrolyses the surface coatings treated therewith so that the surface after treatment may be easily and completely cleaned with water. The product is substantially free of fatty materials and does not leave objectionable residues which would impair the surface coating to be applied afterwards. It is also free of acids and does not attack hands nor brushes.

A preferred composition of the paint remover according to the present invention may be obtained according to the following example:

I. 900 gms. acetone, 700 gms. methylacetate, 500 gms. trichlorethylene, 600 gms. 1,2-dichlorethane and 900 gms. mesityloxide (25.0% acetone, 19.4% methyl acetate, 13.9% trichlorethylene, 16.7% 1,2-dichlorethane, 25.0% mesityloxide) are mixed together and 4–5% by weight of cellulose nitrate dissolved in this mixture.

II. 5–6% of paraffin (white) based on the weight of mixture I are molten and admixed with said mixture I at a temperature of about 50° C. While the mixture I plus II is still warm 8–10% of its weight of Turkey red oil (sulfonated castor oil) acting as an emulsifyer is added during stirring.

Meanwhile 10% of starch based on the weight of the combined mixture I, II and Turkey red oil have been treated with 20% of water calculated on the same base and were then admixed with sufficient 50% NaOH to obtain a viscous mixture.

The two mixtures are then stirred together and cooled.

What I claim is:

1. A paint remover characterised by the following composition:

I. A solvent mixture containing the following constituents:

| | Percent by weight |
|---|---|
| Acetone | between 20.5 and 30.3 |
| Methylacetate | between 15.4 and 24.2 |
| Trichlorethylene | between 10.2 and 18.2 |
| 1,2-dichlorethane | between 12.8 and 21.2 |
| Mesityloxide | between 20.5 and 30.3 |

II. 4–5% of cellulose nitrate based on the weight of the solvent mixture I.

III. 5–6% of paraffin and 8–10% Turkey red oil based on the weight of the combined mixtures I and II, and IV. 5–15% of starch in 15–25% of water based on the total weight of the combined mixtures I, II and III and containing a sufficient amount of a 50% NaOH solution to make the starch-water mixture viscous.

2. A paint remover characterised by the following composition:

I. 25.0% acetone, 19.4% methylacetate, 13.9% trichlorethylene, 16.7% 1,2-dichlorethane, 25.0% mesityloxide, II. 4–5% cellulose nitrate based on mixture I.

III. 5–6% paraffin and 8–10% Turkey red oil based on I plus II,

IV. 10% starch and 20% water based on I+II+III containing a sufficient amount of 50% NaOH to make the starch-water mixture viscous.

FRITZ ZUMBRUNNEN.

REFERENCES CITED

The following references are of record in the file of this patent:

UNITED STATES PATENTS

| Number | Name | Date |
|---|---|---|
| 1,038,783 | Nowak | Sept. 17, 1912 |
| 1,069,057 | Ellis | July 29, 1913 |
| 1,499,101 | Ellis | June 24, 1924 |
| 1,884,767 | Lougovoy | Oct. 25, 1932 |
| 2,209,785 | Manierre | July 30, 1940 |